United States Patent Office

3,690,916
Patented Sept. 12, 1972

3,690,916
PROCESS FOR THE CONTINUOUS OPTICAL BRIGHTENING OF ORGANIC FIBRE MATERIAL
Hans Wegmuller, Riehen, Alois Kleemann, Basel, and Rudolf Keller, Riehen, Switzerland, assignors to Ciba-Geigy AG, Basel, Switzerland
No Drawing. Filed Apr. 6, 1970, Ser. No. 26,166
Claims priority, application Switzerland, Apr. 11, 1969, 5,524/69
Int. Cl. C09k 1/02
U.S. Cl. 117—33.5 T
9 Claims

ABSTRACT OF THE DISCLOSURE

A process for the continuous, non-aqueous optical brightening of organic fibre material, especially fibre material made from natural or synthetic polyamide, is disclosed, which comprises impregnating said fibre material with the solution of at least one optical brightener salt consisting of an anionic radical of an anionic optical brightener and at least one organic nitrogen compound containing at least one nitrogen atom capable of salt formation, in a solvent or solvent mixture, the solvent or solvent mixture consisting of unsubstituted or halogenated hydrocarbon boiling between 50 and 150° C., and, optionally, liquid, water-soluble organic solvent boiling below 220° C., removing excess solvent from the material and finishing the brightening by a heat treatment of the impregnated fibre material at temperatures below the softening point of said fibre material. By this process, on the stated fibre material very effective and even optical brightenings having good fastness properties, such as fastness to dry cleaning and washing, are obtained.

---

The present invention relates to a process for the continuous, non-aqueous optical brightening of organic fibre material, especially fibre material made from natural or synthetic polyamide, to the brightener solutions suitable for the purpose, as well as to the fibre material brightened by this process.

It is known that fibre material made from incompletely acylated cellulose can be brightened by using, amongst others, optical brighteners containing sulphonic acid groups, and which are usually employed as sodium salt, by impregnating this material with the solution of an optical brightener in a water-soluble organic solvent, such as lower alkanols, optionally in admixture with a water-insoluble organic solvent, preferably boiling below 250° C., and removing excess solvent from the material.

It has now been found that it is possible to obtain on organic fibre material such as cellulose, polyacrylonitrile fibres, but especially on natural or synthetic polyamide fibres, appreciably more intensive and more even brightening effects in a continuous manner by impregnating the fibre material with the solution of at least one optical brightener salt, consisting of the anionic radical of an anionic optional brightener and at least one organic nitrogen compound containing at least one nitrogen atom capable of salt formation, in a solvent consisting of unsubstituted or halogenated hydrocarbon boiling between 50 and 150° C., alone or in admixture with a liquid, water soluble organic solvent boiling below 220° C., removing a substantial part of excess solvent from the material and finishing the brightening by a heat treatment of the impregnated fibre material at temperatures below the softening point of the fibre material.

The nitrogen atom, capable of salt formation, of the organic nitrogen compounds, usable according to the invention, can be in the form of a primary, secondary, tertiary or quaternary amino group. Examples of particularly suitable compounds are as follows:

(1) Substituted or unsubstituted aliphatic amines, especially alkylamines, such as butylamine, hexylamine, octylamine, decylamine, dodecylamine, tetradecylamine, octadecylamine, diethylamine, dibutylamine, dioctylamine, didodecylamine, N-methyl-N-dodecylamine, N - ethyl - N-octadecylamine, triethylamine, tributylamine, N,N - dimethyl-N-dodecylamine, N,N-dimethyl - N - octadecylamine, β - hydroxyethylamine, γ - hydroxypropylamine, N-β-hydroxyethyl - N - dodecylamine, γ - methoxypropylamine, N-γ-methoxypropyl - N - dodecylamine, N-β-hydroxyethyl-N-octadecylamine, N,N-dimethyl - N - benzyldodecylammonium hydroxide, N,N,N - trimethyloctadecylammonium hydroxide and trimethyldodecylammonium hydroxide.

(2) Substituted or unsubstituted aliphatic di- and triamines such as 1,2-ethylenediamine, 1,3 - propylenediamine, diethylenetriamine, 1,1 - bis - methyl-propylenediamine, 1,1-bis-dodecylpropylenediamine, 1,1 - bis - cyclohexyl-propylenediamine, 1,1-bis-benzyl-propylenediamine, N,N'-bis-phenyl-ethylenediamine, N,N,N',N'-tetrapropyl-propylenediamine, N,N,N'N' - tetrabenzylpropylenediamine, N,N,N',N'-tetra-β-hydroxyethyl - propylenediamine, 1-dodecyl-ethylenediamine, 1-octadecyl - ethylenediamine and 1-octadecyl-diethylenetriamine.

(3) Substituted or unsubstituted cycloalkylamines such as cyclohexylamine, N-methylcyclohexylamine, N - octyl-cyclohexylamine, N - β - hydroxyethylcyclohexylamine, N - methyl - N - β - hydroxyethylcyclohexylamine, dicyclohexylamine, dihydroabietylamine and trimethylcyclohexylammonium hydroxide.

(4) Substituted or unsubstituted aralkylamines such as benzylamine, β-phenylethylamine, N-β-hydroxyethylbenzylamine, N-γ-methoxypropylbenzylamine, N-β-cyanoethylbenzylamine, N-methyl - N - γ - methoxypropylbenzylamine, N-octylbenzylamine, N-octadecylbenzylamine and dibenzylamine.

(5) Substituted or unsubstituted aromatic amines, especially mononuclear aromatic amines such an aniline, N-methylaniline, N,N - dimethylaniline, N,N-dibutylaniline, N-β-hydroxyethyl-N-methylaniline and toluidine.

(6) Unsubstituted or substituted amidines, especially alkylamidines, such as acetamidine, benzamidine, laurylamidine, stearylamidine, as well as N-methyllaurylamidine, N - butyllaurylamidine, N - phenyllaurylamidine, N-benzyllaurylamidine, N-methylstearylamidine, N - benyl-stearylamidine, or N-cyclohexylstearylamidine.

(7) Substituted isothioureas, preferably S-alkyl-isothioureas, such as S-benzyl-isothiourea, S-hexyl, S-octyl, S-undecyl, S-dodecyl and S-octadecyl-isothiourea.

(8) Guanidines, especially alkylguanidines, such as phenylguanidine, benzylguanidine, dodecylguanidine and octadecylguanidine.

(9) Hydrazines such as phenylhydrazine or undecyl-hydrazine.

(10) N-containing five- or six-membered heterocycles which can be partially or completely saturated.

Examples of five-membered N-containing heterocycles are: pyrroles such as methylpyrrole and benzylpyrrole; pyrrolines such as methylpyrroline or benzylpyrroline; also pyrrolidines such as methylpyrrolidine, butylpyrrolidine or dodecylpyrrolidine; pyrazoles; pyrazolines such as N-methylpyrazoline; pyrazolidines, especially unsubstituted or substituted 2-alkyl-imidazolines, such as 2-heptylimidazoline, 2-undecylimidazoline, 2-heptadecyl-imidazoline, 1-methyl-2-undecylimidazoline, 1-β-hydroxy-ethyl-2- undecylimidazoline, 1-β-hydroxyethyl-2-heptadecylimidazoline and 2-aminoethyl-1-heptadecylimidazoline.

Examples of six-membered N-containing heterocycles are: piperidine and its derivatives, especially N-alkyl- or N-aralkylpiperidine such as N-methylpiperidine, N-dodecylpiperidine and N-benzylpiperidine; piperazines such as N-octadecylpiperazine; morpholine and, in particular, its N-alkyl and N-aralkyl derivatives such as N-butylmorpholine, N-octadecylmorpholine or N-benzylmorpholine; quinuclidine and pyridine, N-methylpyridinium hydroxide and octadecycloxy-methylenepyridinium hydroxide; pyrimidines such as dihydro- and especially tetrahydropyrimidines, preferably 2 - alkyltetrahydropyrimidines, such as 2-heptyl-tetrahydropyrimidine, 2-undecyl-tetrahydropyrimidine, 2-heptadecyl - tetrahydropyrimidine, 1-methyl-2-undecyl-tetrahydropyrimidine or 1-$\beta$-hydroxyethyl-2-heptadecyl-tetrahydropyrimidine; 2-amino-1-octadecyl-tetrahydropyrimidine; 1,3,5-triazines, particularly derivatives of the 2,4,6-triamino-1,3,5-triazine such as 2-dodecylamino-4,6-bis-amino-1,3,5-triazine or 2-octadecylamino-4,6-bis-amino-1,3,5-triazine, 2 - heptadecyl-4,6-bis-amino-1,3,5-triazine; or hexahydro-1,3,5-triazine derivatives.

(11) Condensed N-containing heterocycles such as indolines and indoles.

Preferred organic nitrogen compounds are alkylamines having preferably from 12 to 18 carbon atoms in the alkyl radical such as dodecylamine and octadecylamine; alkylguanidines having preferably from 12 to 18 carbon atoms in the alkyl radical such as dodecylguanidine or octadecylguanidine; alkylamidines having preferably from 12 to 18 carbon atoms in the alkyl radical such as N-methyl-stearylamidine or N-benzyl-laurylamidine; 2-alkylimidazolines and 2-alkyltetrahydropyrimidines having preferably from 11 to 18 carbon atoms in the alkyl radical such as 2-undecyl-imidazoline, 2-heptadecylimidazoline, 2-undecyltetrahydropyrimidine and 2-heptadecyltetrahydropyrimidine and their 1-alkyl derivatives; cycloalkylamines and aralkylamines, such as dicyclohexylamine and dibenzylamine, as well as S-alkyl-isothioureas having preferably from 11 to 18 carbon atoms in the alkyl radical such as S-undecyl-, S-dodecyl- and S-octadecyl-isothiourea.

The use, according to the invention, of the organic nitrogen compounds, as defined, promotes the diffusion of the optical brighteners into the fibres, as a result of which the fastness properties of the brightenings obtained therewith are in many cases improved.

The anionic optical brighteners usable according to the invention contain, as defined, e.g. one or more carboxylic acid groups, but particularly one or more sulphonic acid groups, and they can belong to very diverse classes. Particularly brilliant brightening effects are obtained with compounds which are derived from the class of the stilbenes. Suitable derivatives from this class are preferably those of 4,4'-bis-triazinylamino-stilbene sulphonic acids, stilbylnaphthotriazole sulphonic acids, or 4,4'-bis-triazolylstilbene sulphonic acids, especially 4,4'-v-triazolyl-stilbene sulphonic acids.

A further group of preferred brighteners comprises derivatives of diaryl- and triarylpyrazolines containing carboxylic acid and, in particular, sulphonic acid groups, as well as derivatives of dibenzothiophenedioxides containing sulphonic acid groups.

Suitable hydrocarbons, boiling between 50 and 150° C., are, e.g. aromatic hydrocarbons such as toluene or xylene. Preferably, however, halogenated, especially chlorinated hydrocarbons are used, e.g. chlorobenzene, but particularly, on account of their generally better regeneration property and noncombustibility, lower aliphatic halogenated hydrocarbons especially chlorinated hydrocarbons, e.g. chloroform, carbon tetrachloride, tri- or tetrachloroethylene ("perchloroethylene"), trifluorotrichloroethane, dichloroethane, trichloroethane, tetrachloroethane or dibromoethylene. It is also possible to use mixtures of such solvents.

Care must be exercised in choosing the solvent or solvent mixture that, with the optimum white-effect, no damage, or minimum damage, to the fibres occurs.

In certain cases, it has proved advantageous to use a solvent mixture consisting of from 50 to 99, especially from 80 to 99% by weight of chlorinated lower aliphatic hydrocarbon boiling between 50 and 150° C., and from 50 to 1, particularly from 20 to 1% by weight of a liquid, water-soluble, organic solvent boiling below 220° C.

By "liquid, water-soluble, organic solvents boiling below 220° C." are meant thermostable solvents which are soluble in water, not to the extent of only fractions of one percent but to the extent of several percent. Examples of these are: higher alkanols such as butanols or amyl alcohols, cycloaliphatic alcohols such as cyclohexanol, araliphatic alcohols such as benzyl alcohol, or aliphatic or cycloaliphatic ketones such as methylethyl ketone or cyclohexanone. Such solvents, as defined, are preferred, however, which are miscible with water in any proportion. Examples of these are: monovalent lower aliphatic alcohols such as lower alkanols, e.g. methanol, ethanol, n- or iso-propanol; alkylene glycol monoalkyl ethers such as ethylene glycol monomethyl or monoethyl ether; also furfuryl or tetrahydrofurfuryl alcohol, or divalent aliphatic alcohols such as ethylene glycol or 1,2-propylene glycol; also lower aliphatic ketones such as acetone, lower cyclic ethers such as dioxane; also N,N-dialkylamides of lower monocarboxylic acids such as dimethylformamide or dimethylacetamide, amides of carbonic acid such as N,N, N',N'-tetramethylurea, cyclic amides such as N-methyl-pyrrolidone, as well as mixtures of such liquid, water-soluble, organic solvents.

The composition of the solvent or solvent mixture is governed by the solubility of the anionic optical brightener or brightener mixture to be used. The composition should be such that a homogeneous and clear brightener solution is obtained.

Preferred solvent mixtures consist of from 90 to 99% by weight of trichloroethylene, perchloroethylene or trichloroethane and from 10 to 1% by weight of a lower alkanol such as methanol, or of an N,N-dialkylamide of lower monocarboxylic acids, such as dimethylacetamide or dimethylformamide.

The production of the optical brightener salts from the anionic optical brightener and the organic nitrogen compound containing at least one nitrogen atom capable of salt formation, can be performed in situ, i.e. in the solvent or solvent mixture itself. Preferably, however, the optical brightener salts are first produced, in a manner known per se, and then added to the solvent or solvent mixture. In this case, the optical brightener salts can be prepared by double reaction of the alkali metal or ammonium salts, particularly the sodium salts of the optical brightener, advantageously in the heat, with a salt of an organic nitrogen compound, usable according to the invention, with a strong acid, e.g. hydrochloric acid, or by direct neutralisation of the anionic optical brighteners in the form of their free acids with the organic nitrogen compounds. If the optical brightener salts are prepared in situ, then also the anionic optical brighteners are preferably used in the form of their alkali metal or ammonium salts, particularly in the form of their sodium salts. The organic nitrogen compound also is advantageously used in the form of a salt with a strong acid. In this case, it is advantageous to remove insoluble constituents, if any, from the brightening liquor, e.g. by filtration, before the introduction of the fibre material to be brightened.

When anionic optical brighteners are used which are capable of forming anions having two or more negative charges, it is often not necessary that these charges be completely compensated by the organic nitrogen compound.

The brightener liquor, usable according to the invention, preferably contains, depending on the type of the optical brightener, from 0.01 to 10, especially from 0.1 to 3% by weight of optical brightener.

Suitable organic fibre materials, which can be brightened using the process according to the invention, are, amongst others, cellulose esters such as cellulose-2½- and -triacetate, also high-molecular esters of aromatic polycarboxylic acids with polyfunctional alcohols, e.g.

polyethylene glycol terephthalate, polyurethane, polymeric and copolymeric acrylo- and methacrylonitrile, as well

EXAMPLE 1

0.2 g. of the optical brightener salt of the formula

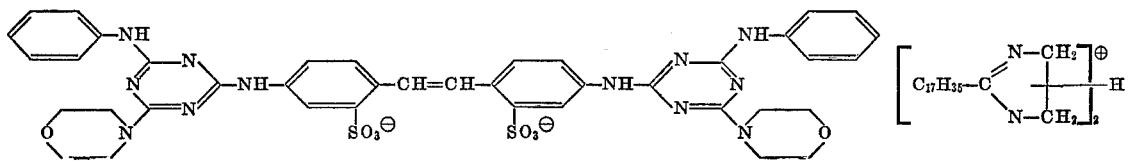

as polyolefins such as polyethylene and polypropylene. The process according to the invention is suitable, in particular, for the brightening of natural and regenerated cellulose fibres such as cotton or viscose, especially fibre material made from natural polyamide such as wool, or preferably made from synthetic polyamide such as Polyamide 6.6 and Polyamide 6. The stated fibre material can be brightened, according to the invention, in any chosen form, e.g. in the form of flock, slubbing, yarn or—preferably—fabrics.

The impregnating of the fibre material is carried out, e.g. by coating or spraying, particularly, however, by padding. In this case, the fibre material is advantageously passed continuously through the brightener liquor at room temperature and afterwards squeezed out to obtain the desired content of impregnating solution of about from 30 to 150% by weight, relative to the dry weight of the material. The impregnated fibre material is then finished by a heat treatment, e.g. at temperatures between 70 and 220° C., optionally after preliminary drying, advantageously in a hot air-stream at about 40 to 80° C. Suitable means of applying the heat treatment are by contact heat, application of high-frequency alternating currents, exposure to infra-red or treatment in a hot airstream. Preferably, however, the finishing of the impregnated fibre material, especially natural or synthetic polyamide fibre material, is carried out by means of a moist heat treatment, particularly by steaming with saturated steam at temperatures between about 95 and 105° C., preferably between 98 and 102° C.

are dissolved in a solvent mixture consisting of 970 g. of trichloroethylene and 30 g. of methanol. With the obtained solution fabric made from Polyamide 6.6 is impregnated at room temperature, the impregnated fabric is squeezed out to obtain a liquor absorption of about 60%, relative to the dry weight of the material, and dried at 40° to 80° in an air-stream. The optical brightener is afterwards thermofixed during 30 seconds at 190°.

The thus treated substrate exhibits a brilliant whiteeffect.

By using, instead of Polyamide 6.6, cotton cretonne or a fabric made from regenerated cellulose or from polyacrylonitrile, proceeding otherwise as stated in the example, a brilliant white-effect is obtained also on these materials.

It is possible to brighten, in the same manner, polyethylene glycol terephthalate and cellulose triacetate fabrics.

EXAMPLE 2

1 g. of the optical brightener salt of the formula

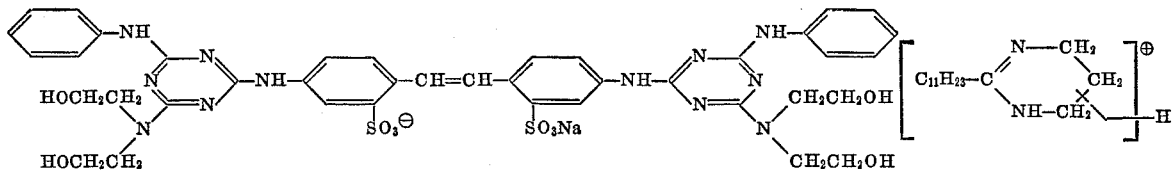

is dissolved in a solvent mixture consisting of 930 g. of trichloroethylene and 70 g. of methanol. A knitted fabric made from Polyamide 6 is impregnated with this solution, as described in Example 1. The impregnated material is afterwards steamed for 5 minutes at 100 to 102°.

An even and strong white-effect is obtained on the above mentioned material.

The above optical brightener salt is obtained, e.g. as follows:

19.2 g. of the optical brightener of the formula

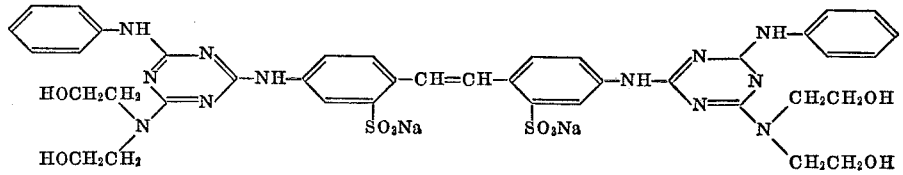

Using the process according to the invention on the organic fibre material, effective, very even and fast optical brightenings, e.g. fast to dry cleaning and washing, are obtained.

Since the technical carrying out of the process enables the solvents used to be recovered and used again in the brightening process, contrary to previously known processes, there is no problem of waste water purification. Furthermore, rinsing baths are unnecessary which constitutes a further advantage of the process according to the invention.

The following examples illustrate the invention. The temperatures are given in degrees centigrade.

are dissolved in 2 litres of water at 85° Separately, 4.8 g. of an organic nitrogen compound of the formula

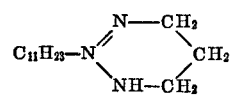

are dissolved in 2 litres of water at 50°, with the addition of 2 ml. of 30% hydrochloric acid. These two solutions are poured together at 50°, whereby the salt of the above formula is immediately obtained as precipitate. The whole is allowed to stand overnight, the salt is filtered off on the following day and dried in vacuo at 50 to 60°.

EXAMPLE 3

1 g. of the optical brightener salt of the formula

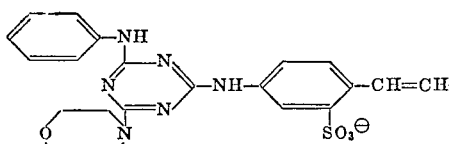

is dissolved in a solvent mixture consisting of 930 g. of trichloroethylene and 70 g. of methanol. With the obtained clear solution a fabric made from Polyamide 6.6 is impregnated at room temperature, the impregnated fabric is squeezed out to obtain a liquor absorption of about 60%, relative to the dry weight of the material, and dried at 40 to 80° in an air-stream. The impregnated and dried fabric is afterwards thermofixed during 30 seconds at 190°.

An even and strong white-effect is obtained.

By using, instead of a fabric made from Polyamide 6.6, a fabric or knitted material made from Polyamide 6 or from polyester, proceeding otherwise as stated in the example, a brilliant and strong white-effect is likewise obtained.

If the impregnated Polyamide 6.6 fabric is not thermofixed at 190° but treated with saturated steam at 100 to 102° for 5 minutes, then an optical brightening effect of equal quality is obtained.

If, in the above example, the 70 g. of methanol are replaced by an equal amount of one of the solvents listed

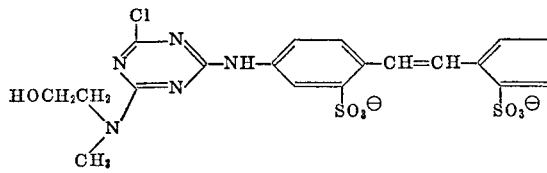

in the following Table I, Column 2, the procedure being otherwise the same as described in the example, then brilliant white-effects of equal quality are obtained.

TABLE I

| Example No. | Water-miscible solvents |
|---|---|
| 4 | Ethanol. |
| 5 | Isopropanol. |
| 6 | Ethylene glycol monomethyl ether. |
| 7 | Tetrahydrofurfuryl alcohol. |
| 8 | Dimethylacetamide. |
| 9 | N,N,N',N'-tetramethyl urea. |
| 10 | Dioxane. |
| 11 | N-methylpyrrolidone. |
| 12 | Dimethylformamide. |

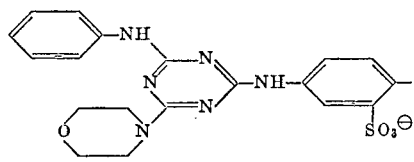

If, in Examples 3 to 12 instead of 930° g. of trichloroethylene the same amount of one of the hydrocarbons or chlorinated hydrocarbons given in the following Table II, Column 2 is used, with otherwise the same procedure as described in this example, then likewise even and well developed optical brightenings are obtained.

TABLE II

| Example No. | Hydrocarbon or chlorinated hydrocarbon |
|---|---|
| 13 | Toluene. |
| 14 | Xylene. |
| 15 | Tetrachloroethylene. |

EXAMPLE 16

0.960 g. of the sodium salt of the optical brightener of the formula given in Example 2 are dissolved in 50 g. of

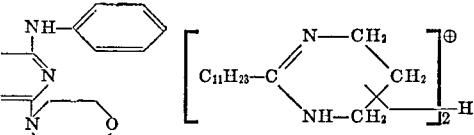

methanol. Separately, 0.476 g. of an organic nitrogen compound of the formula

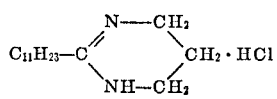

are dissolved in 20 g. of methanol. Both solutions are combined, well stirred and then diluted with 930 g. of trichloroethylene. Small amounts of precipitated substances, mainly consisting of sodium chloride, are removed by filtration. With the thus obtained solution fabric made from Polyamide 6 is impregnated and squeezed out to obtain a liquor absorption of 60%, relative to the dry weight of the material. The impregnated fabric is dried in an air-stream at 80° and thermofixed at 190° for 30 seconds. In this manner an even, brilliant, strong white-effect is obtained.

EXAMPLE 17

1 g. of the optical brightener salt of the formula

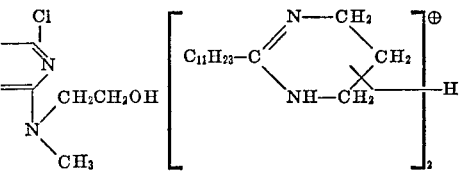

is dissolved in a solvent mixture consisting of 930 g. of trichloroethylene and 70 g. of methanol. With this solution a knitted fabric made from Polyamide 6 is impregnated, as described in Example 1. The material is afterwards steamed for 5 minutes at 100 to 102° and under about 0.2 atmosphere.

An even and strong white-effect is thus obtained on the above mentioned material.

Instead of Polyamide 6 in the above example a fabric made from polyester or from Polyamide 6.6 can be used. Also on these materials, after steaming at 100 to 102° during 5 minutes, a beautiful, strong white-effect is obtained.

EXAMPLE 18

1 g. of the optical brightener salt of the formula

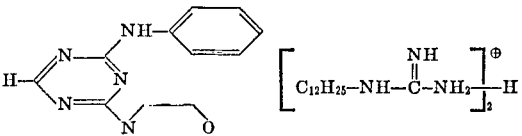

is dissolved in a solvent mixture consisting of 930 g. of trichloroethylene and 70 g. of methanol. With this solution a fabric made from Polyamide 6 is impregnated. The brightening is afterwards thermofixed for 30 seconds at 190°.

A strong white-effect is obtained on this material.

If, instead of thermofixing the impregnated fabric at 190°, it is treated with saturated steam at 100 to 102° for 5 minutes, then a brightening effect of equal quality is obtained.

If, instead of the brightener salt given in the above example, the same amount of one of the brightener salts given in the following Table III, Column 2, is used, the procedure being otherwise as described in the example, then similar brightening effects on Polyamide 6 fabric are obtained.

TABLE III

| Ex. No. | Optical brightener salts |
|---|---|
| 19 | Ph−NH−CO−NH−C₆H₃(SO₃⁻)−CH=CH−C₆H₃(SO₃⁻)−NH−CO−NH−Ph   [C₁₈H₃₇NH₂]₂⁺H |
| 20 | Ph−NH−CO−NH−C₆H₃(SO₃⁻)−CH=CH−C₆H₃(SO₃⁻)−NH−CO−NH−Ph   [C₁₂H₂₅−N(CH₃)₂−CH₂−Ph]₂⁺ |
| 21 | (PhNH-triazine-OCH₃)−NH−C₆H₃(SO₃Na)−CH=CH−C₆H₃(SO₃⁻)−NH−(triazine-OCH₃-NHPh)   [Ph−NH−Ph]⁺H |
| 22 | (PhNH-triazine-OCH₃)−NH−C₆H₃(SO₃Na)−CH=CH−C₆H₃(SO₃⁻)−NH−(triazine-OCH₃-NHPh)   [Ph−CH₂−NH−CH₂−Ph]₂⁺H |
| 23 | (pyrazole-Ph)−C₆H₃(SO₃⁻)−CH=CH−C₆H₃(SO₃⁻)−(pyrazole-Ph)   [C₂₂H₂₅N(CH₃)₂]₂⁺H |
| 24 | Ph−CH=CH−C₆H₃(SO₃⁻)−(naphthotriazole)   [Ph−NH−Ph]⁺H |
| 25 | Ph−CH=CH−C₆H₃(SO₃⁻)−(naphthotriazole)   [C₁₈H₃₇−NH−CH₂CH₂NH₂]⁺H |
| 26 | ⁻O₃S−C₆H₄−N(pyrazoline-Ph)=C−C₆H₄−Cl   [(C₄H₉)₂−NH]⁺H |
| 27 | ⁻O₃S−C₆H₄−N(pyrazoline-Ph)=C−C₆H₄−Cl   [C₁₇H₃₅−imidazoline]⁺H |
| 28 | ⁻O₃S−C₆H₄−N(pyrazoline-Ph)=C−C₆H₄−Cl   [C₁₁H₂₃−C(NH)(NH−C₄H₉)]⁺H |

TABLE III—Continued

| Ex. No. | Optical brightener salts |
|---|---|
| 29 | |
| 30 | |
| 31 | |
| 32 | |

EXAMPLE 33

2 g. of the optical brightener salt of the formula

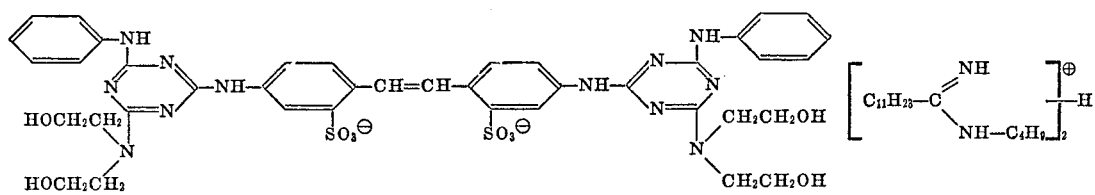

are dissolved in a solvent mixture consisting of 900 g. of trichloroethylene and 100 g. of dimethylacetamide. With this solution a knitted fabric made from Polyamide 6 is impregnated as described in Example 1. The impregnated knitted fabric is afterwards steamed for 5 minutes at a temperature of 100 to 102°.

An even, strong white-effect is obtained on the above mentioned material.

If a fabric made from cellulose triacetate is treated with the above mentioned solution, the procedure being otherwise as stated, then on this material too a strong white-effect is obtained.

If a fabric made from cellulose-2½-acetate is padded with the above solution, the fabric squeezed out to obtain a liquor absorption of 60%, relative to the dry weight of the material, and the material then treated for 30 seconds at 160°, cellulose-2½-acetate fabric having a beautiful even white-effect is obtained.

The above optical brightener salt is obtained, e.g. as follows:

19.2 g. of the sodium salt of the optical brightener of the formula given in Example 2 are dissolved in 2 liters of water at 85°. Separately, 10.16 g. of a compound of the formula

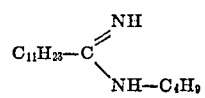

are dissolved in 2 litres of water at 50°, with the addition of 4 ml. of 30% hydrochloric acid. These two solutions are combined at 60°, whereby the formed salt immediately precipitates. The whole is allowed to stand overnight, the salt is filtered off on the following day and dried in vacuo at 50 to 60°.

This optical brightener salt is very easily soluble, e.g. in methanol, ethanol, benzyl alcohol and in dimethylformamide.

EXAMPLE 34

1 g. of the optical brightener salt of the formula

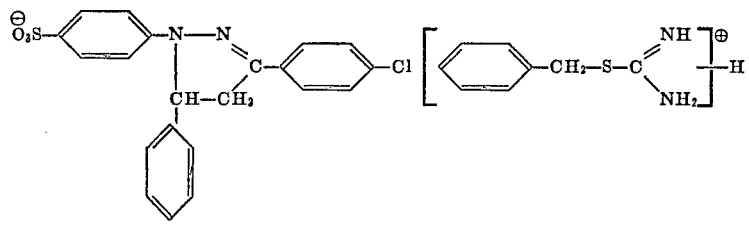

is dissolved in a solvent mixture consisting of 930 g. of trichloroethylene and 70 g. of methanol. With this solution a fabric made from Polyamide 6.6 is impregnated at room temperature, the impregnated fabric is squeezed out to obtain a liquor absorption of about 60%, relative to the dry weight of the material, and dried at 40° to 80° in an air-stream. The impregnated and dried material is afterwards thermofixed during 30 seconds at 190°.

An even and strong white-effect is obtained in this manner.

If, instead of a fabric made from Polyamide 6.6, a fabric made from Polyamide 6 or from polyester is used, the procedure being otherwise as described above, then also a brilliant, strong white-effect is obtained.

If the impregnated Polyamide-6.6-fabric is not thermofixed at 190° but treated with saturated steam at 100 to 102° for 5 minutes, then an optical brightening effect of equal quality is obtained.

EXAMPLE 35

1 g. of the optical brightener salt of the formula

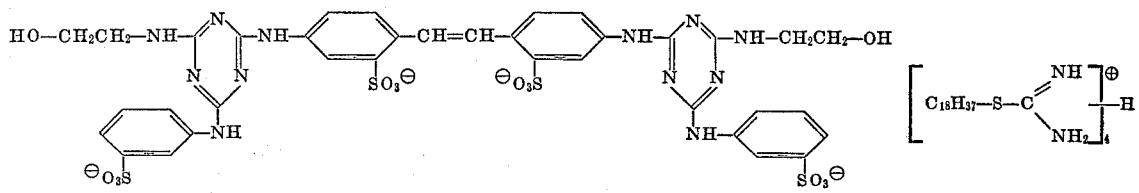

is dissolved in a solvent mixture consisting of 900 g. of trichloroethylene and 100 g. of methanol. With this solution a knitted material made from Polyamide 6 is impregnated as described in Example 1. The impregnated material is then steamed at 100 to 102° and about 0.2 atmosphere for 5 minutes.

An even and strong white-effect is obtained on the above-mentioned material.

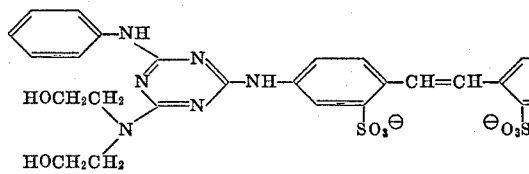

In the above example, instead of a knitted material made from Polyamide 6, also a fabric made from polyester or Polyamide 6.6 can be used. After steaming at 100 to 102° for five minutes, with otherwise the same procedure as indicated above, also on these materials a beautiful, strong white-effect is obtained.

EXAMPLE 36

1 g. of the optical brightener salt of the formula

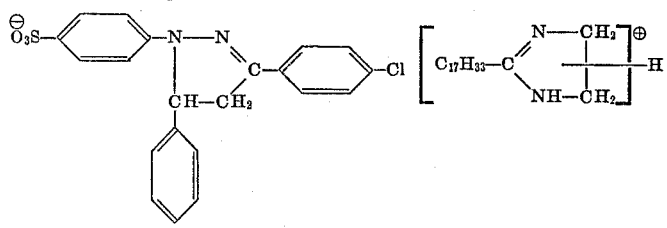

is dissolved in 999 g. of trichloroethylene. With this solution a knitted material made from Polyamide 6 is impregnated as described in Example 1. The impregnated material is then steamed at 100 to 102° and about 0.2 atmosphere for 5 minutes.

An even and strong white-effect is obtained on the above-mentioned material.

In the above example, instead of a knitted material made from Polyamide 6, also a fabric made from polyester or Polyamide 6.6 can be used. After steaming at 100 to 102° for 5 minutes, with otherwise the same procedure as indicated above, also on these materials a beautiful, strong white-effect is obtained.

EXAMPLE 37

1 g. of the optical brightener salt of the formula

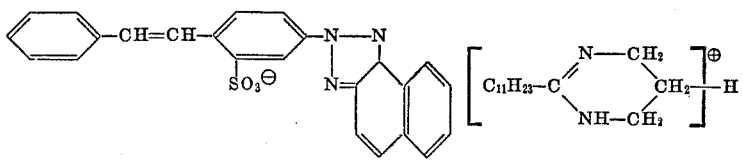

is dissolved in 999 g. of tetrachloroethylene. With the obtained clear solution a fabric made from Polyamide 6.6 is impregnated at room temperature, the impregnated fabric is squeezed out to obtain a liquor absorption of about 60%, relative to the dry weight of the material, and dried at 40° to 80° in an air-stream. The impregnated and dried material is afterwards thermofixed during 30 seconds at 190°.

An even and strong white-effect is obtained in this manner.

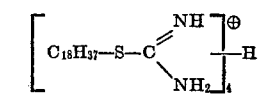

If the impregnated Polyamide-6.6-fabric is not thermofixed at 190° but treated with saturated steam at 100 to 102° for 5 minutes, then an optical brightening effect of equal quality is obtained.

EXAMPLE 38

2 g. of the optical brightener salt of the formula

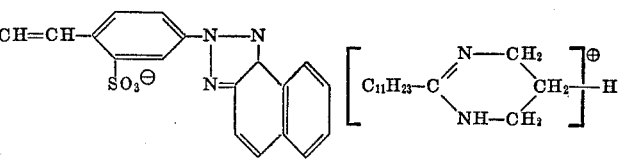

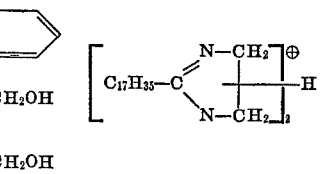

are dissolved in a solvent mixture consisting of 920 g. of tetrachloroethylene and 80 g. of dimethylacetamide. With the obtained clear solution a fabric made from Polyamide 6.6 is impregnated as described in Example 1. The impregnated material is afterwards steamed for five minutes at a temperature of 100 to 102°.

An even, strong white-effect is obtained on the above-mentioned material.

What we claim is:
1. A process for the continuous, non-aqueous optical brightening of organic fibre material, comprising:
(a) impregnating said fibre material with the solution of at least one optical brightener salt consisting of an anionic radical of an anionic optical brightener and at least one organic nitrogen compound containing at least one nitrogen atom capable of salt formation, selected from the group consisting of alkylamines having from 12 to 18 carbon atoms in the alkyl radical, alkylguanidines having from 12 to 18 carbon atoms in the alkyl radical, alkylamidines having from 12 to 18 carbon atoms in the alkyl radical, 2-alkylimidazolines and 2-alkyl-tetrahydropyrimidines having from 11 to 18 carbon atoms in the alkyl radical, cycloalkylamines, aralkylamines, and S-alkylisothioureas having from 8 to 18 carbon atoms in the alkyl radical.

(I) in a solvent selected from unsubstituted or halogenated hydrocarbons having a boiling point between 50 and 150° C., or (II) in a solvent mixture which consists of ($\alpha$) unsubstituted or halogenated hydrocarbons having a boiling point between 50 and 150° C., and ($\beta$) a liquid, water-soluble, organic solvent boiling below 220° C., and selected from the group consisting of alkanols, cycloaliphatic alcohols, araliphatic alcohols, aliphatic and cycloaliphatic ketones, alkylene glycol monoalkyl ethers, furfuryl alcohol, tetrahydrofurfuryl alcohol, divalent aliphatic alcohols, lower cyclic ethers, N,N-dialkylamides of lower monocarboxylic acids, amides of carbonic acid, cyclic amides and mixtures thereof, (b) removing a substantial part of excess solvent from the material, and (c) finishing the brightening by a heat treatment of the impregnated fibre material at temperatures below the softening point of said fibre material.

2. A process as described in claim 1, characterised by the use of derivatives of 4,4'-bis-triazinylaminostilbene sulphonic acids, stilbylnaphthotriazole sulphonic acids, 4, 4'-bis-triazolylstilbene sulphonic acids or of derivatives of diaryl- and triarylpyrazolines containing carboxylic acid or sulphonic acid groups.

3. A process as described in claim 1, wherein the solvent defined under (I) consists of lower aliphatic halogenated hydrocarbons.

4. A process as described in claim 3, wherein said solvent is trichloroethylene, perchloroethylene or trichloroethane.

5. A process as described in claim 1, wherein the solvent mixture defined under (II) consists of ($\alpha$) from 80 to 99% by weight of chlorinated, lower aliphatic hydrocarbon boiling between 50 and 150° C., the balance consisting of ($\beta$) a liquid, water-soluble, organic solvent boiling below 220° C., and selected from the group consisting of alkanols, cycloaliphatic alcohols, araliphatic alcohols, aliphatic and cycloaliphatic ketones, alkylene glycol monoalkyl ethers, furfuryl alcohol, tetrahydrofurfuryl alcohol, divalent aliphatic alcohols, lower cyclic ethers, N,N-dialkylamides of lower monocarboxylic acids, amides of carbonic acid, cyclic amides and mixtures thereof.

6. A process as described in claim 5, wherein the water-soluble organic solvent defined under II($\beta$) is selected from the group consisting of methanol, ethanol, n.propanol, isopropanol, butanol, pentanols, cyclohexanol, benzyl alcohol, acetone, methylethyl ketone, cyclohexanone, ethylene glycol monomethyl ether, ethylene glycol monoethyl ether, furfuryl alcohol, tetrahydrofurfuryl alcohol, ethylene glycol, 1,2-propylene glycol, dioxane, dimethylformamide, dimethylacetamide, N,N,N',N'-tetramethyl urea, N-methylpyrrolidone, and mixtures of such solvents.

7. A process as described in claim 5, characterised by the use of a solvent mixture consisting of from 90 to 99% by weight of trichloroethylene, perchloroethylene or trichloroethane, the balance consisting of methanol, dimethylacetamide or dimethylformamide.

8. A process as described in claim 1, wherein the impregnated fibre material is subjected to a moist heat treatment.

9. A process as described in claim 1, characterised by the use of natural or synthetic polyamide fibres as organic fibre material.

References Cited
UNITED STATES PATENTS

| | | | |
|---|---|---|---|
| 2,972,611 | 2/1961 | Zweidler et al. | 117—33.5 T |
| 2,784,184 | 3/1957 | Zweidler et al. | 260—240 C |
| 3,459,744 | 8/1969 | Dorlars et al. | 117—33.5 T |
| 3,496,112 | 2/1970 | Goldwasser et al. | 117—33.5 T |

RALPH S. KENDALL, Primary Examiner

U.S. Cl. X.R.

252—301.2; 260—240 C